(12) United States Patent
Gifford et al.

(10) Patent No.: US 10,137,642 B1
(45) Date of Patent: Nov. 27, 2018

(54) METHODS TO FORM 3D OBJECTS USING CROSS-LINKABLE OR SINTERABLE MATERIALS

(71) Applicants: Karl Joseph Gifford, Norcross, GA (US); Daniel Joseph Hutchison, Alpharetta, GA (US); Tai Dung Nguyen, Fremont, CA (US); Tue Nguyen, Fremont, CA (US)

(72) Inventors: Karl Joseph Gifford, Norcross, GA (US); Daniel Joseph Hutchison, Alpharetta, GA (US); Tai Dung Nguyen, Fremont, CA (US); Tue Nguyen, Fremont, CA (US)

( * ) Notice: Subject to any disclaimer, the term of this patent is extended or adjusted under 35 U.S.C. 154(b) by 499 days.

(21) Appl. No.: 14/704,945

(22) Filed: May 5, 2015

Related U.S. Application Data

(60) Provisional application No. 61/988,864, filed on May 5, 2014.

(51) Int. Cl.

| B29C 67/02 | (2017.01) |
|---|---|
| B29C 67/00 | (2017.01) |
| B29K 101/12 | (2006.01) |
| B29K 105/24 | (2006.01) |
| B29K 105/00 | (2006.01) |
| B29K 105/16 | (2006.01) |
| B29K 509/02 | (2006.01) |
| B29L 31/00 | (2006.01) |

(52) U.S. Cl.
CPC ...... B29C 67/0066 (2013.01); B29C 67/0092 (2013.01); *B29K 2101/12* (2013.01); *B29K 2105/0097* (2013.01); *B29K 2105/16* (2013.01); *B29K 2105/24* (2013.01); *B29K 2509/02* (2013.01); *B29L 2031/772* (2013.01)

(58) Field of Classification Search
CPC ...... B29C 67/02; B29C 67/0055; B33Y 30/00
See application file for complete search history.

(56) References Cited

U.S. PATENT DOCUMENTS

| 2011/0114839 A1* | 5/2011 | Stecker | B22F 3/1055 |
| | | | 250/307 |
| 2012/0251689 A1* | 10/2012 | Batchelder | A23G 1/0056 |
| | | | 426/383 |
| 2014/0034626 A1* | 2/2014 | Illston | B22F 3/1055 |
| | | | 219/121.78 |
| 2014/0048969 A1* | 2/2014 | Swanson | B29C 67/0055 |
| | | | 264/129 |
| 2014/0268607 A1* | 9/2014 | Wicker | H05K 1/0284 |
| | | | 361/761 |

(Continued)

OTHER PUBLICATIONS

Rumschoettel, Dominik, et al., "A Novel Piezoelectric Printhead for High Melting Point Liquid Metals". Pan-Pacific Microelectronics Symposium (Pan Pacific), 2016, pp. 1-8.*

(Continued)

*Primary Examiner* — Bret P Chen

(57) ABSTRACT

Methods to form cross-linked or sintered objects include forming walls for reservoir layers, with cross-linkable or sinterable materials deposited in the reservoir layers. The cross-linkable or sinterable materials can then be cross-linked, e.g., changing the structure of the deposited cross linkable materials, or sintered, e.g., heat treated to fused the sinterable materials together. The walls for the reservoir layers can be removed after the objects are formed.

20 Claims, 13 Drawing Sheets

(56) References Cited

U.S. PATENT DOCUMENTS

| | | | |
|---|---|---|---|
| 2015/0217517 A1* | 8/2015 | Karpas | B29C 67/0055 |
| | | | 264/464 |
| 2015/0235069 A1* | 8/2015 | Kumar | G06K 7/1426 |
| | | | 235/462.09 |
| 2015/0273766 A1* | 10/2015 | Denda | B29C 67/0081 |
| | | | 264/483 |

OTHER PUBLICATIONS

Vlasea, Mihaela, et al., "A combined additive manufacturing and micro-syringe deposition technique for realization of bio-ceramic structures with micro-scale channels". Int J Adv Manuf Technol (2013) 68:2261-2269.*

Suter, M., et al., "MHD printhead for additive manufacturing of metals". Procedia CIRP 2 (2012) 102-106, 1st CIRP Global Web Conference: Interdisciplinary Research in Production Engineering.*

* cited by examiner

FIG. 1B         FIG. 1C

FIG. 2
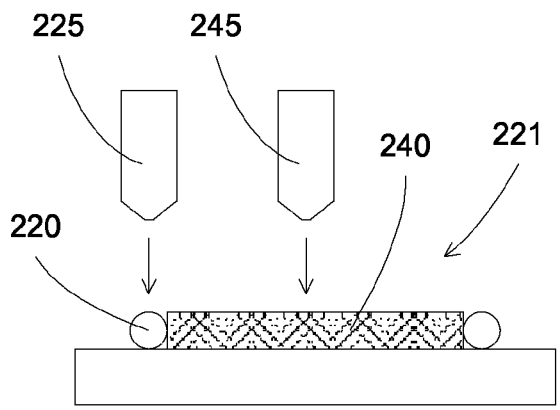
FIG. 2A
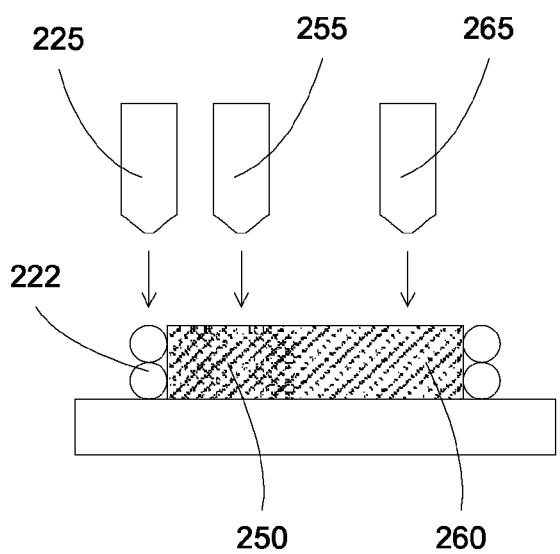
FIG. 2B

FIG. 3

```
Forming a first printer head or a first material delivery
head, wherein the first printer head is operable to print
lines of a first material
300
          |
          v
Forming a second printer head or a second material
delivery head, wherein the second printer head is
operable to form layers of a second material, wherein the
layers are surrounded by the lines
310
```

FIG. 3A

```
Forming a first printer head or a first material delivery
head, wherein the first printer head is operable to print
lines, wherein the lines form an area
330
          |
          v
Forming a second printer head or a second material
delivery head, wherein the second printer head comprises
a first assembly for filling the area with a sinterable
material, wherein the second printer head comprises a
second assembly for solidifying the sinterable material
340
```

FIG. 3B

FIG. 4
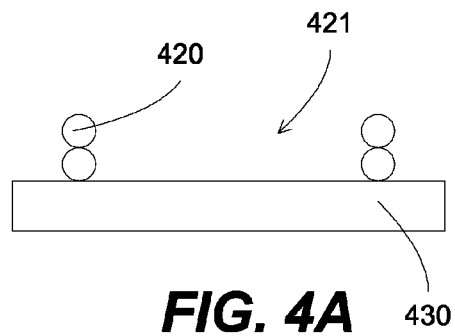
FIG. 4A
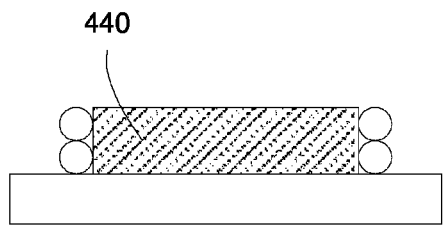
FIG. 4B
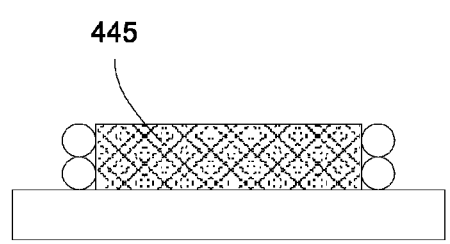
FIG. 4C
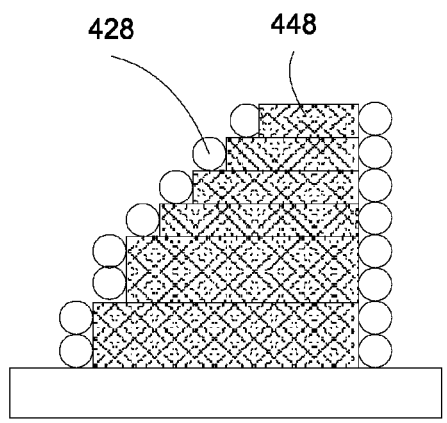
FIG. 4D
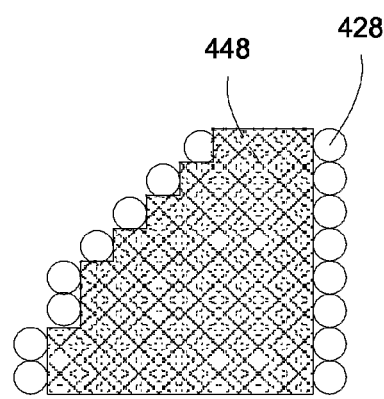
FIG. 4E
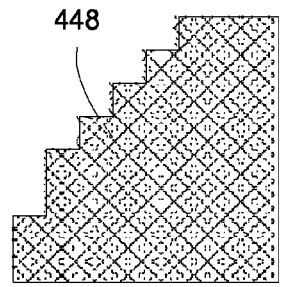
FIG. 4F

FIG. 5
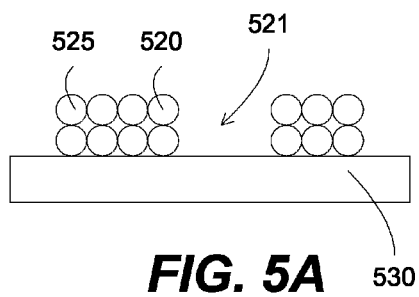
FIG. 5A
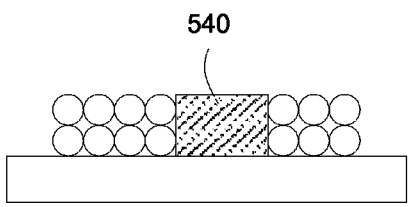
FIG. 5B
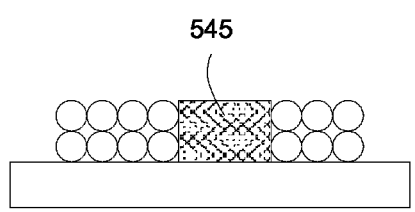
FIG. 5C
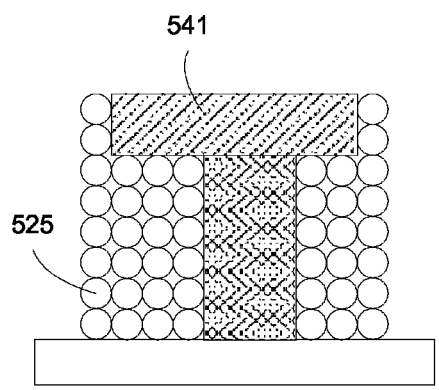
FIG. 5D
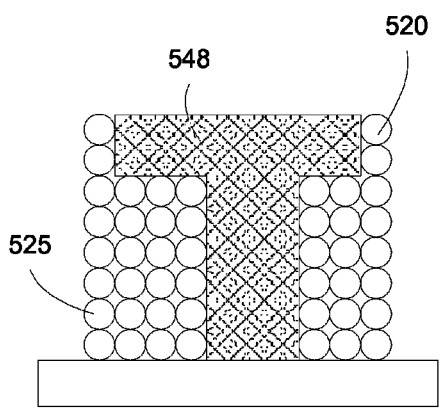
FIG. 5E
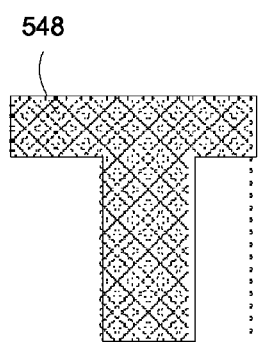
FIG. 5F

FIG. 7
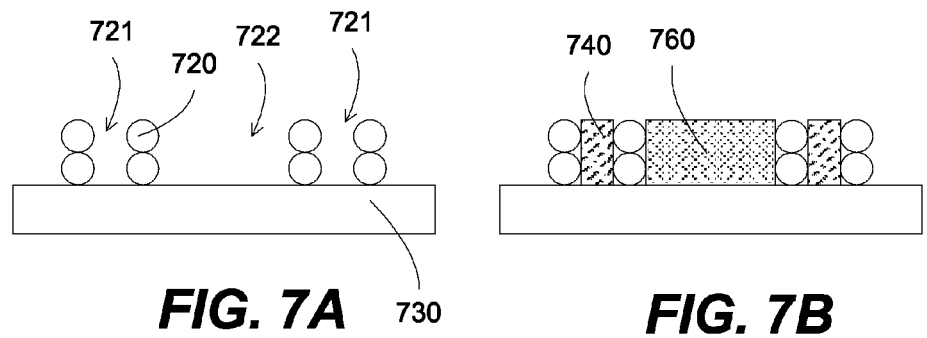
FIG. 7A  FIG. 7B
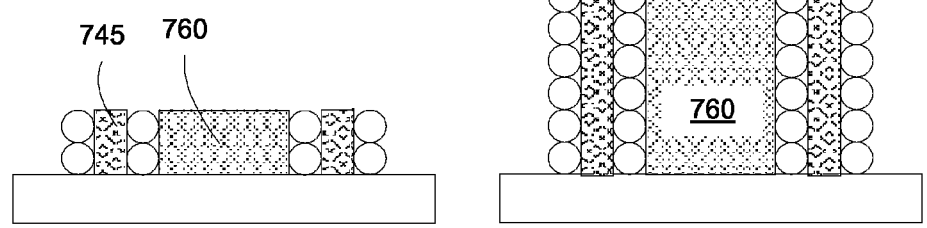
FIG. 7C  FIG. 7D
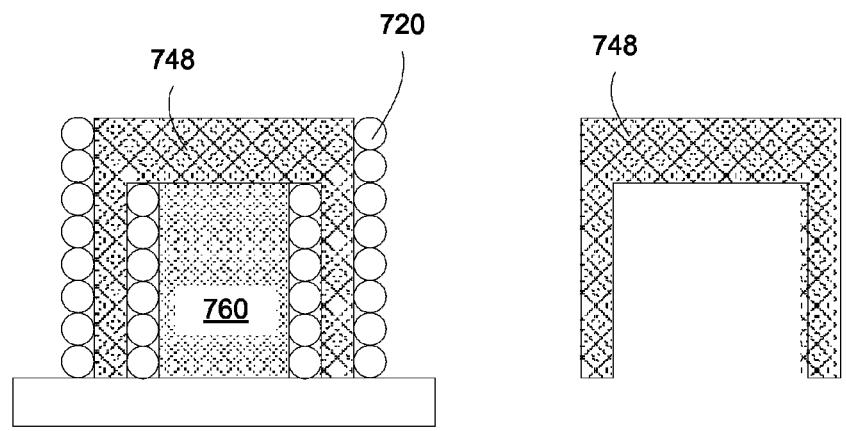
FIG. 7E  FIG. 7F

FIG. 10
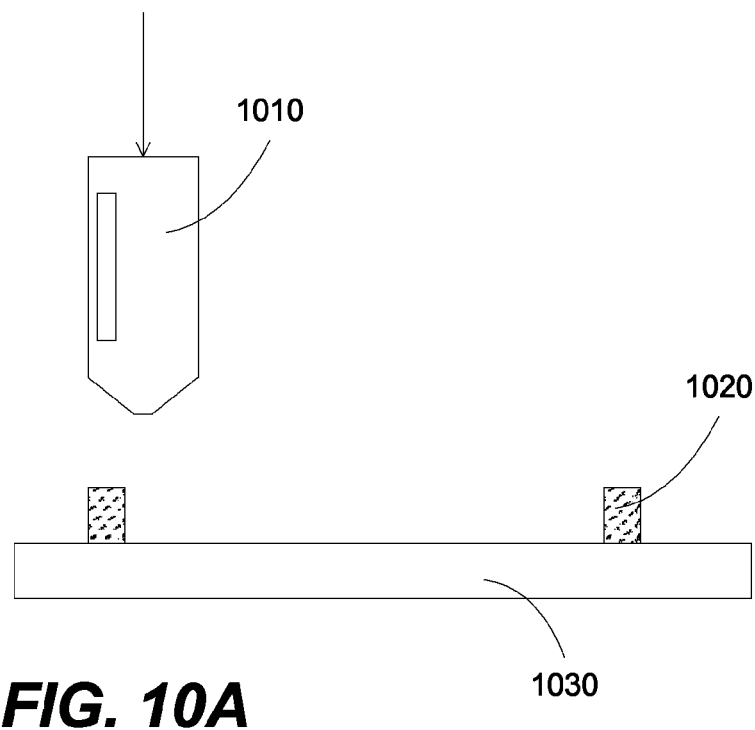
FIG. 10A
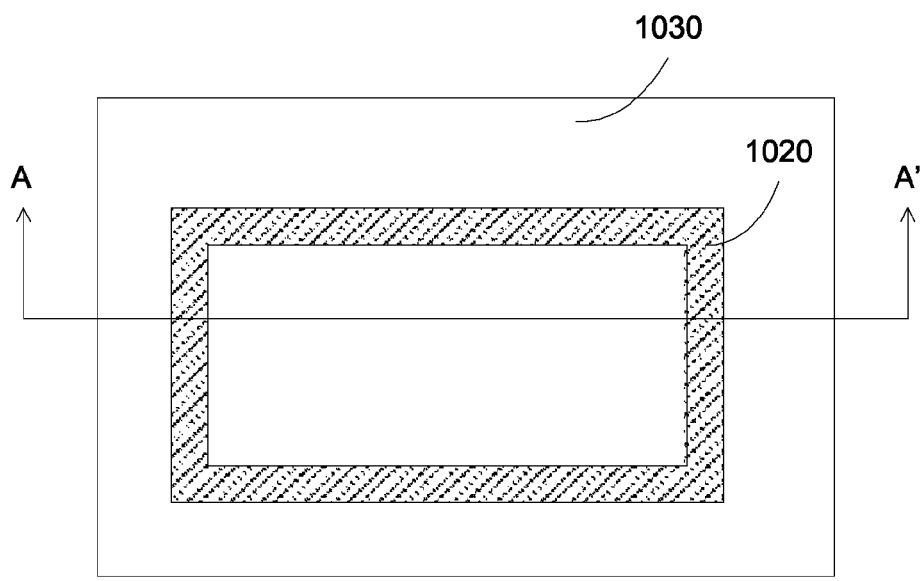
FIG. 10B

FIG. 14
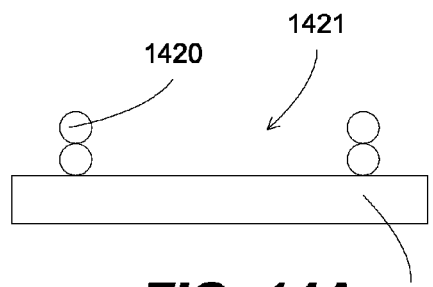
FIG. 14A
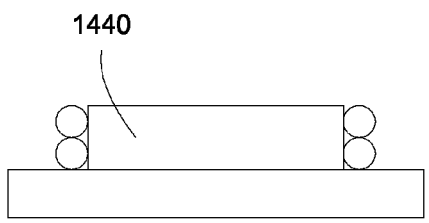
FIG. 14B
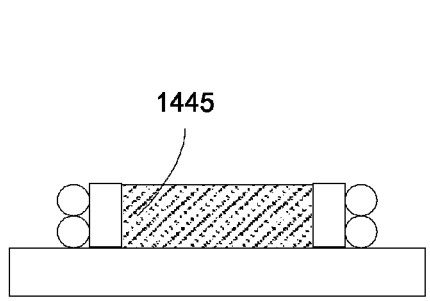
FIG. 14C
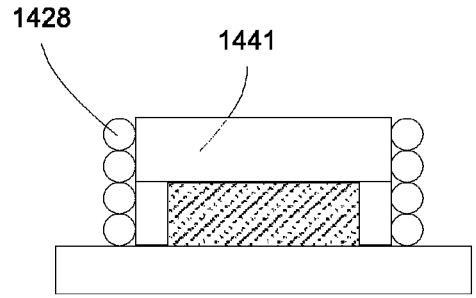
FIG. 14D
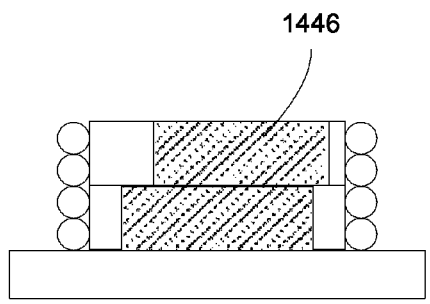
FIG. 14E
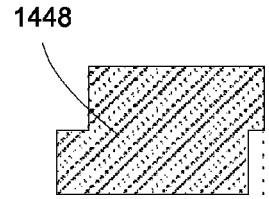
FIG. 14F

METHODS TO FORM 3D OBJECTS USING CROSS-LINKABLE OR SINTERABLE MATERIALS

BACKGROUND OF THE INVENTION 3D printers can be used to build solid objects by printing layers by layers of building materials. The building materials can be in liquid or semi liquid form at the 3D printer head, for example, a solid material can be heated and then extruded from a 3D printer nozzle. The layers of building materials can be solidified on a substrate.

3D printer systems can use a fused filament fabrication (FFF) process (sometimes called fused deposition modeling (FDM) process) in which a filament is moved, e.g., by a filament moving mechanism, toward a heated zone. The filament can be melted, and extruded on a platform to form a 3D object. The melted filament can adhere to the walls of the heated printer head, resulting in a deformed printed lines.

It would therefore be advantageous to have advanced 3D printing systems and methods that have improved printing mechanisms.

SUMMARY OF THE EMBODIMENTS

In some embodiments, the present invention discloses methods and systems for forming 3D objects using cross-link or sinterable materials. A 3D printer head can be used to print walls for reservoir layers. Cross linkable or sinterable materials can be deposited in the reservoir layers and then cross linked, e.g., changing the structure of the deposited cross linkable materials, or sintered, e.g., heat treated to fused the sinterable materials together. The walls for the reservoir layers can be viewed as a mold for confining the cross linkable or sinterable materials. The process can be continue until a 3D object is formed.

BRIEF DESCRIPTION OF THE DRAWINGS

FIGS. 2A-2B illustrate schematics for forming 3D objects according to some embodiments.

FIGS. 3A-3B illustrate flow charts for forming 3D printing systems according to some embodiments.

FIGS. 4A-4F illustrate a 3D printing flow process according to some embodiments.

FIGS. 5A-5F illustrate a 3D printing flow process according to some embodiments.

FIGS. 7A-7F illustrate a 3D printing flow process according to some embodiments.

FIGS. 10A-10B illustrate a flow process for forming a 3D object according to some embodiments.

FIGS. 14A-14F illustrate a 3D printing flow process according to some embodiments.

DETAILED DESCRIPTION OF THE EMBODIMENTS

Additive manufacturing processes generally fabricate 3D objects by depositing layers by layers in patterns corresponding to the shape of the objects. At each layer, a print head can deposit building materials at locations corresponded to the pattern of the object for that layer.

3D printing processes can include inkjet printing, stereolithography and fused filament fabrication. In inkjet printing processes, liquid material are released from an inkjet print head, and solidified on the substrate surface, e.g., on the model being formed. In stereolithography processes, a UV light can crosslink layers of photopolymer. In fused filament fabrication processes, a continuous filament of thermoplastic can be softened or melted and then re-solidified on a previously deposited layer. Alternatively, paste-like materials can be used for printing, for example, through a pressure extrusion device such as a piton/cylinder.

Various polymers are used, including acrylonitrile butadiene styrene (ABS), polycarbonate (PC), polylactic acid (PLA), high density polyethylene (HDPE), PC/ABS, and polyphenylsulfone (PPSU). Other materials can be used, such as clay or ceramic materials.

Figure 1:
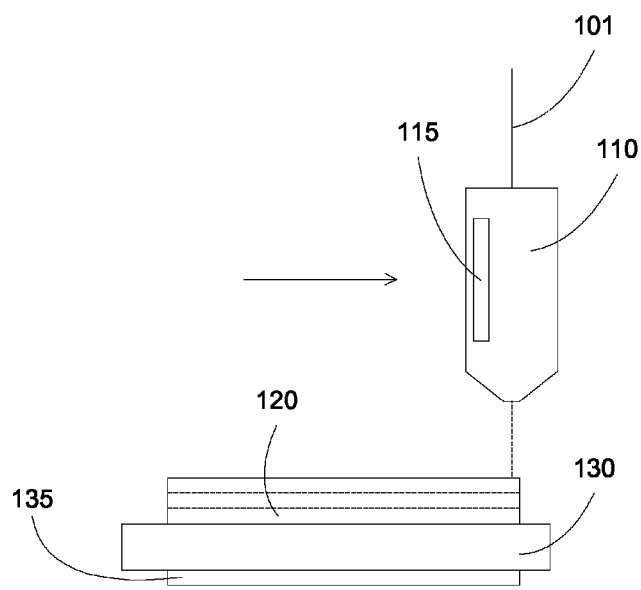
FIGS. 1A-1C illustrate 3D printer systems according to some embodiments.
Figure 1A:
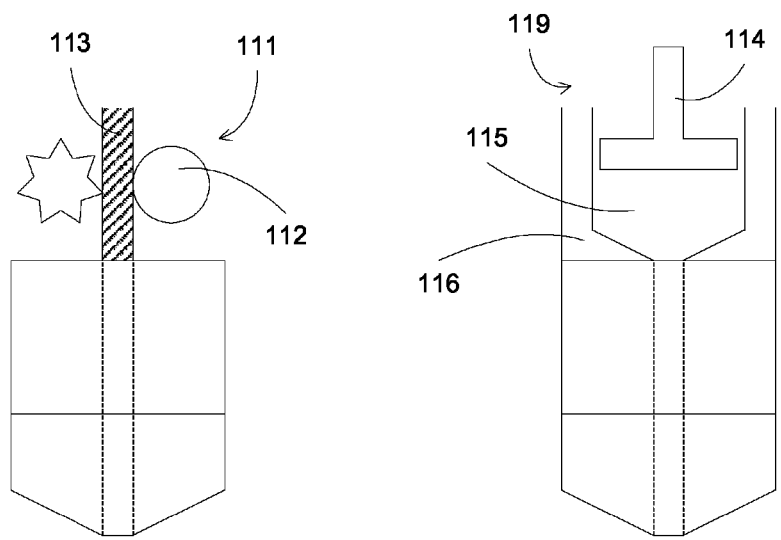

FIGS. 1A-1C illustrate 3D printer systems according to some embodiments. FIG. 1A shows a schematic configuration of a 3D printer system, including a printer head assembly for printing an object on a platform. A filament 101, such as a thermoplastic filament, can be used to supply material to an extrusion nozzle head 110. The nozzle head 110 can include mechanism to regulate the flow of material. For example, a worm-drive or rotating gears can be used to push the filament into the nozzle at a controlled rate. The nozzle head 110 can include a heater 115, which can heat the filament material to a temperature that can melt or soften the filament material, for example, to a temperature higher than the glass transition temperature of the filament material. The material extruded from the nozzle head can be harden immediately on a support table 130 or on the previously deposited layer 120.

The extrusion head can be moved in horizontal and vertical directions, for example, by computer controlled mechanisms using stepper or servo motors. In addition, motors can also be used to move the support table 130. The table 130 can also include heater 135. The extrusion head can move relative to the support table 130 in x, y, z directions, in addition to possible rotation theta direction. For example, the support table can be configured to move in the y direction. The printer head can be configured to move in the x and z directions.

FIG. 1B shows a schematic of a printer head assembly that is configured for extruding from a filament material. A filament 113, such as a thermoplastic filament, can be provided to a delivery assembly 111. The delivery assembly 111 can include a mechanism to regulate the flow of filament material. For example, a worm-drive 112 or rotating gears can be used to push the filament into the printer head at a controlled rate. The printer head can include a heater, which can heat the filament material to a temperature that can melt or soften the filament material, for example, to a temperature higher than the glass transition temperature of the filament material. The printer head can be thermally isolated from the delivery assembly, for example, by a low temperature coefficient material.

FIG. 1C shows another schematic of a printer head assembly that is configured for extruding from a paste-like material. Paste-like material 115, such as plasticine or a ceramic paste, can be provided to a delivery assembly 119. The delivery assembly 119 can include a mechanism to deliver the paste-like material, such as a piston/cylinder configuration. For example, paste-like material 115 can be disposed in a cylinder 116, and can be pressed by a piston 114 so that the paste-like material can be push into the printer head at a controlled rate.

In some embodiments, the present invention discloses methods and systems for forming 3D objects using a 3D printer head. The 3D printer head can be used to print walls for reservoir layers. Cross linkable or sinterable materials can be deposited in the reservoir layers and then cross linked, e.g., changing the structure of the deposited cross linkable materials, or sintered, e.g., heat treated to fused the sinterable materials together. The walls for the reservoir layers can be viewed as a mold for confining the cross linkable or sinterable materials.

The object can be built layers by layers. Each layer can include walls that are printed by a 3D printer head. Inside the walls is the material that is formed by filling the layer with a cross linkable or sinterable material such as a powder polymer, and then treated to cross link or to sinter the cross linkable or sinterable material, respectively. The 3D printer head can print the walls of a close loop for forming a reservoir layer. A powder dispenser can be used to fill the reservoir layer with a cross linkable or sinterable material. A planarization assembly, such as a squeegee assembly, can be used to smooth the cross linkable or sinterable material, for example, for confining the material to the reservoir layer. A treating assembly, such as a laser, a ultraviolet system or an infrared system, can be used for cross link, such as UV cross link the cross linkable material, or sinter, such as heat treating the sinterable material.

FIGS. 2A-2B illustrate schematics for forming 3D objects according to some embodiments. In FIG. 2A, a 3D printer head 225 can be used to print boundary lines 220 of reservoir layers. The boundary lines 220 can form a reservoir area 221. In some embodiments, the boundary lines can be prepared so that the reservoir area matches exactly a cross sectional area of the object. In some embodiments, the boundary lines can be formed to provide a reservoir area that is slightly larger than the cross sectional area, such as less than 2 mm or less than 1 mm larger. The boundary lines can include one or more layers of lines, depending on the subsequent process. As shown, one layer of lines 220 are used to form the reservoir layer 221.

In some embodiments, the reservoir area can be large to accommodate the object, e.g., larger than the largest layer of the object.

A second building assembly 245 can be used to fill the reservoir layers with a material 240. The material 240, or a portion of the material 240 that is conformed to the outline of the object, can be treated, for example, cross linking or sintering. The process can be repeated, e.g., the object can be formed layers by layers, with the layers representing cross sectional areas of the object.

The boundary lines 220 can be solid lines, formed on a surface by a 3D printer head, such as filament driven or paste driven printer head. In some embodiments, the boundary lines can form an outer shell of the object, e.g., the external surfaces of the object or the surfaces facing the environment. The external surfaces can be outer external surfaces, meaning the surfaces of the object that can be touched from outside. The external surfaces can be inner external surfaces, meaning the surfaces of the object that can or cannot have fluid communication with the outside ambient. For example, the inner external surface can be the surface of a void in the object, which does not have fluid communication with the outside ambient. The inner external surface can be the surface of a deep cavity in the object, which has fluid communication with the outside ambient but through narrow pathways.

In some embodiments, the boundary lines 220 can be printed layers by layers. The 3D printer head can print the boundary lines of a bottom layer, then the printer head can move upward to print the boundary lines of the next layer, after the area inside the boundary lines have been filled by a second building assembly.

The boundary lines 220 can form reservoir area inside the boundary lines 220, which can be in the shape of a layer, confined by the boundary lines. Material 240 can fill the reservoir area, forming a cross sectional layer of the body.

In some embodiments, the present invention discloses a 3D printing process using a layered casting concept. An object to be formed can be dissected into adjacent cross sectional areas. Boundary lines for the cross sectional areas can form molds, and materials can be cast inside the mold. For example, powdered materials can fill the mold, and then subjected to a heat treatment process to fuse the powered materials. When the powdered materials is solidified, the boundary lines can be removed, leaving the solid materials. Alternatively, materials can fill the mold, and then subjected to a UV treatment process to cross link the materials. When the materials is cross linked, the boundary lines can be removed, leaving the cross linked materials. The boundary lines and the casting materials can be formed by a 3D printing process.

A difference of the layered casting process to the conventional casting process is that the layered casting process is performed layers by layers. In other words, cross sectional areas of the object are sequentially cast by layers. In addition, the mold is built as the part is built, e.g., a first mold for a first layer is formed, then the part inside the first mold is cast. Then a second mold for a second layer, which is adjacent to the first layer, is formed before casting the part inside the second mold.

Advantages of the 3D printing process using layered casting concept include minimum wasting of casting materials. Using the boundary lines as molds, only the amount of needed casting materials is used to fill the area inside the boundary lines. There can be no casting materials disposed outside the boundary lines, thus there is minimum or no waste of casting materials in the casting process. Other advantages include no seal is needed for casting the materials, since the boundary lines is built as the part is cast. The parameters of the casting process are controlled by the 3D printer, thus minimum skills in molding processes are required.

FIG. 2B shows another schematic of a 3D printer system using a layered casting process. A 3D printer head 225 can be used to print boundary lines 222 of reservoir layers. As shown, two layer of lines 222 are used to form the reservoir layers. The two layers are shown to be separated, e.g., two circles tangenting to each other. Other configurations can also be used, such as two circles merging to a ellipse or rectangular cross sectional area.

The number of layers for the boundary lines can be determined by the resolution of the reservoir layers. For example, if the top reservoir layer is similar to the bottom reservoir layer, in term of cross section areas of the 3D object to be printed, two layers of boundary lines can be used for forming a thicker reservoir layer.

The number of layers for the boundary lines can be determined by the subsequent process for treating the reservoir layers. For example, if a laser beam is used to fusing a sinterable material in the reservoir layer, then the thickness of the reservoir layer can be determined by the depth of the fusing process. If a UV light is used to cross link or treat a material in the reservoir area, then the thickness of the reservoir layer can be determined by the depth of the UV treatment process.

The casting assembly can include a first head 265 for filling the reservoir layer with a castable material 260, such as a cros linkable material or sinterable material or powdered material. The casting assembly can include a second head 255, which can be used to solidify the castable material 260, e.g., turning a loosely connected material 260 into a solidly bonded material 250. For example, the castable material 260 can include a sinterable polymer, such as sinterable nylon. The castable material 260 can be in a powdered form, and can be delivered by a nozzle in the first head 265. The second head 255 can include a heat treating system, such as a laser beam assembly, which can heat the sinterable material 260 and can fuse the sinterable material 260 into a solidly bonded material 250. The castable material 260 can include a powdered material, such as a metal in powder form. The second head 255 can include a binder delivery system, such as a nozzle delivering a binder such as glue, which can bond the powdered material 260 to form a solidly bonded material 250. The bonded material 250 can be fragile, since the powder in it is bonded by the binder material. An optional curing process, such as an ex-situ heat treatment in an oven, can be used to solidify the bonded material 250, such as burning out the binder and fusing the metal powder.

The first head 265 can include a raster nozzle, which can cover the surface area of the reservoir for delivering the castable material. The second head 255 can include a raster assembly, which can cover the surface area of the reservoir for treating the castable material, such as a laser beam rastering the reservoir area for heat treating the castable material, or a binder nozzle rastering the reservoir area for delivering binder to the castable material. The second head 255 can include a large area processing assembly, e.g., processing a portion or the whole of the reservoir area at once, such as a projector for delivering IR light or delivering UV light to a large patterned area.

FIGS. 3A-3B illustrate flow charts for forming 3D printing systems according to some embodiments. In FIG. 3A, operation 300 forms a first printer head, wherein the first printer head is operable to print lines of a first material. The first printer head can include a 3D printer head, having a nozzle to deliver the first material as lines across a platform. The first printer head can be coupled to a movement assembly for moving the first printer head relative to the platform, at least in x, y, and z directions. The first material can include polymer materials, such as polymer filaments or polymer paste. Other materials can be used, such as ceramic materials. The first printer head can be a material delivering head.

Operation 310 forms a second printer head, wherein the second printer head is operable to form layers of a second material, wherein the layers are surrounded by the lines. The second printer head can include a nozzle, which is rastered in the area defined by the lines to cover the layer area. The second printer head can include a nozzle together with a planar element, for delivering material in the area defined by the lines to cover the layer area with the planar element planarizing the delivered material. The second printer head can be a material delivering head. In some embodiments, the first and second printer heads are operable for forming different types of materials. For example, the first printer head can be operable to form boundary lines, e.g., mold for the material delivered by the second printer head.

In FIG. 3B, operation 330 forms a first printer head, wherein the first printer head is operable to print lines, wherein the lines form an area. Operation 340 forms a second printer head, wherein the second printer head comprises a first assembly for filling the area with a castable material, wherein the second printer head comprises a second assembly for solidifying the castable material. The castable material can include a sinterable material, which can be fused together by a heat treatment process. The castable material can include a powdered material, which can be bonded together by a glue or binder application.

FIGS. 4A-4F illustrate a 3D printing flow process according to some embodiments. An object can be designed in three dimensional construction. The object then can be dissected layers by layers, e.g., generating multiple cross sectional layers. Each cross sectional layer can include a cross sectional area, and multiple cross sectional areas or layers can be assembled next to each other to form the object. The thicknesses of the cross sectional layers can be determined by the casting process, e.g., not by the resolution of the 3D printer head, but by the fusing process of the subsequent casting process. For example, if a laser can fuse a castable material at a thickness of 0.3 mm, then the thickness of the cross sectional layer can be 0.3 mm or less. If the resolution of the 3D printer is 0.1 mm, then 3 lines can be printed on top of each other. Alternatively, one layer of lines can be used, to improve the vertical resolution of the casting process.

In FIG. 4A, a 3D printer head can be used to print boundary lines 420 of a cross sectional layer of the object on a platform 430. As shown, two layers of lines are used, but other number of layers can be used, such as 1 layer of lines, or more than 2 layers of lines. The boundary lines can form a reservoir area 421. In some embodiments, the reservoir area 421 is the same (or slightly larger, e.g., 1 or 2 mm larger) than the cross sectional area of the object. Thus, after removing the boundary lines, the reservoir area can resemble the object cross sectional area. The boundary lines can include a polymer or ceramic material, which can be printed by a 3D printer head. In some embodiments, the boundary lines can be removed and discarded after forming the part.

In FIG. 4B, a castable material 440 is deposited in the reservoir area 421. The castable material 440 can be in a powder form, which can be provided to the reservoir area 421 by a rastering nozzle. The castable material can include a sinterable material, such as a sinterable polymer. The castable material can include a glueable material, such as a metal or ceramic powder. An optional leveling process can be used after depositing the castable material 440 in the reservoir area 421, for example, to fill any area not having castable material and to remove excess castable material.

In FIG. 4C, the castable material 440 is treated to form a solidly bonded layer 445. The treatment process can include a heat treatment, e.g., by a laser beam or an infrared light. The treatment process can include a radiation treatment, e.g., by a UV light. The treatment process can include a bonding treatment, e.g., by dispensing a glue layer on the castable material 440 to bond the castable material together. The castable material can include a sinterable material, such as sinterable nylon, which can be fused together under a heat treatment such as a laser or IR light. The castable material can include a powder or paste material, which can be solidified using a binder material or heat light or UV light.

In FIG. 4D, the process is repeated for subsequent cross sectional layers, e.g., adjacent layers, to build the object. The boundary lines 428 can be printed on another boundary line, or can be printed on the solidly bonded material 448. In addition, boundary lines with similar or different layers, e.g., number of lines on top of each other, can be used. The solidly bonded material is shown as having a layered structure to illustrate that the layers are sequentially formed. In practice, the layers can be fused together, e.g., the bonding of a layer can extend beyond the thickness of the layer, to bond the layer with the layer immediately below.

In FIG. 4E, the object can be removed from the platform 430, forming an object having solidly bonded material 448 bounded by boundary lines 428. In some embodiments, the boundary lines 428 can be removed, leaving the object formed by the solidly bonded material 448 (FIG. 4F).

FIGS. 5A-5F illustrate a 3D printing flow process according to some embodiments. In FIG. 5A, a 3D printer head can be used to print boundary lines 520 of a cross sectional layer of the object on a platform 530. The boundary lines can form a reservoir area 521. Additional lines 525 can be printed outside of the boundary lines 520. The additional lines 525 can be calculated to serve as support structure for a subsequently process.

In FIG. 5B, a castable material 540 is deposited in the reservoir area 521. In FIG. 5C, the castable material 540 is treated to form a solidly bonded layer 545.

In FIG. 5D, the process is repeated for subsequent cross sectional layers, e.g., adjacent layers, to build the object. The additional lines 525 can be used to form a base layer for a subsequent deposited layer, such as castable material layer 541. The castable material layer 541 can be solidly bonded, together with bonding with underlayers to form object 548, surrounded by boundary lines 520 and additional lines 525. In FIG. 5E, the object can be removed from the platform 530, forming an object having solidly bonded material 548 bounded by lines 520 and 525. In FIG. 5F, the boundary lines 520 and the additional lines 525 can be removed, leaving the object formed by the solidly bonded material 548.

Figure 6:
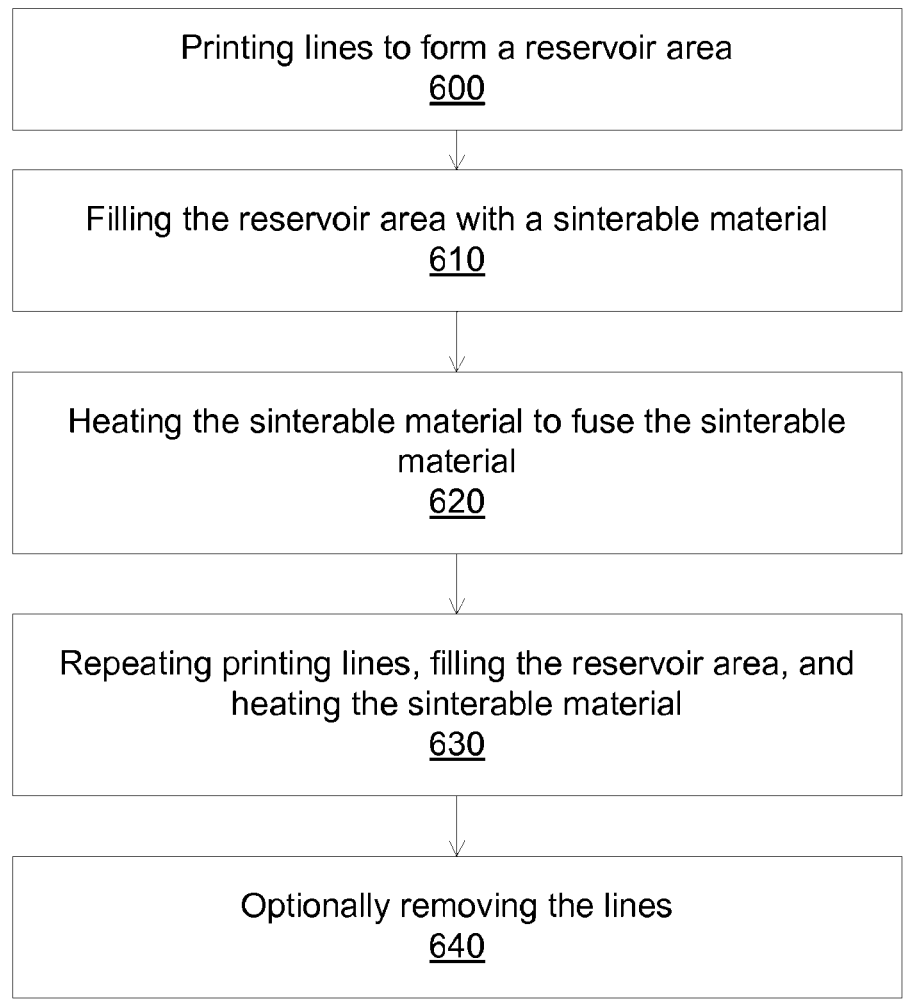
FIG. 6 illustrates a flow chart for a 3D printing process according to some embodiments.

FIG. 6 illustrates a flow chart for a 3D printing process according to some embodiments. Operation 600 prints lines to form a reservoir area. Additional lines for supporting structure can also be printed. Operation 610 fills the reservoir area with a castable material. Operation 620 treats the castable material to bond the castable material. Operation 630 repeats printing lines, filling the reservoir area, and treating the castable material. Operation 640 optionally removes the lines.

In some embodiments, the reservoir area can include one or more close loops. The close loops can be the cross sectional areas of a structure to be printed. For example, a solid close loop can be a cross sectional area of the object. An open close loop can be a void area in the cross sectional area. The lines can form the reservoir area larger, e.g., outside of the periphery, than the cross sectional areas of the structure. The lines, or the loops, can be at a peripheral of the cross sections of the structure, such as less than 2 mm, or less than 1 mm away from the boundary of the cross sections of the structure. The lines can form the reservoir area at the periphery of the cross sectional areas of the structure, e.g., the outer boundary of the lines coincides with the outer periphery of the cross sectional areas. The lines can form one or more levels before filling with the castable material.

In some embodiments, the lines can be printed using a 3d printer head. The lines can be printed using filament materials such as ABS, PLA. The lines can be printed using paste materials such as plasticine, clay.

In some embodiments, the castable material can include powder materials or porous materials. The castable material can include castable polymer, such as castable nylon. The castable material can include porous castable polymer. The castable material includes materials that can be fused together, such as sintered, to form a solid material. The castable material can be poured or provided to the reservoir area, then flattened to be leveled with the top surfaces of the lines The castable material can be provided to the reservoir area by a nozzle assembly. The nozzle assembly can travel in x-y direction, similar to the printer head.

In some embodiments, the platform can vibrate to assist in filling the castable material. The castable material can be leveled by a flat surface, such as a horizontal polymer bar, e.g., rubber blade of a squeegee. The spilled over material can be removed by sucking, blowing, or having a hollow platform. The castable material can be filled to the lines, or can be separated from the lines by a distance of less than 2 mm, or less than 1 mm.

In some embodiments, the castable material can be heat treated, such as laser treating or infrared treating. The castable material in the reservoir area can be heat treated at once by a large beam of infrared or laser, or can be heat treated sequentially, such as rastering by a laser beam. The height of the lines can be determined by the depth of the heat treating process. The lines can be removed, leaving the solidly bonded material. In some embodiments, the lines can be bonded to the solidly bonded material.

FIGS. 7A-7F illustrate a 3D printing flow process according to some embodiments. In FIG. 7A, a 3D printer head can be used to print boundary lines 720 of a cross sectional layer of the object on a platform 730. The boundary lines can form a reservoir areas 721. The boundary lines can also form support area 722.

In FIG. 7B, a castable material 740 is deposited in the reservoir areas 721. Further, a second material 760 can be deposited in a support area 722. The second material 760 can be similar, e.g., a castable material, as the castable material 740. The second material 760 can be different, e.g., a material that is not castable.

In FIG. 7C, the castable material 740 is treated to form a solidly bonded layer 745. The second material 760 remains unchanged, e.g., not becoming a solidly bonded material as the material 740. If the second material 760 is also a castable material, then the treatment is selective, e.g., only the material 740 is treated while the material 760 is not treated. If the second material 760 is not a castable material, then the treatment can be non selective, e.g., the materials 740 and 760 are all treated, but only the castable material 740 becomes a solidly bonded material, while the non castable material 760 remain unchanged.

In FIG. 7D, the process is repeated for subsequent cross sectional layers, e.g., adjacent layers, to build the object. The second material 760 can be used to form a support structure for a subsequent deposited layer, such as castable material layer 741. The castable material layer 741 can be solidly bonded, together with bonding with underlayers to form object 748, surrounded by boundary lines 720. In FIG. 7E, the object can be removed from the platform 730, forming an object having solidly bonded material 748 bounded by lines 720. In FIG. 7F, the boundary lines 720 can be removed, leaving the object formed by the solidly bonded material 748.

Figure 8:
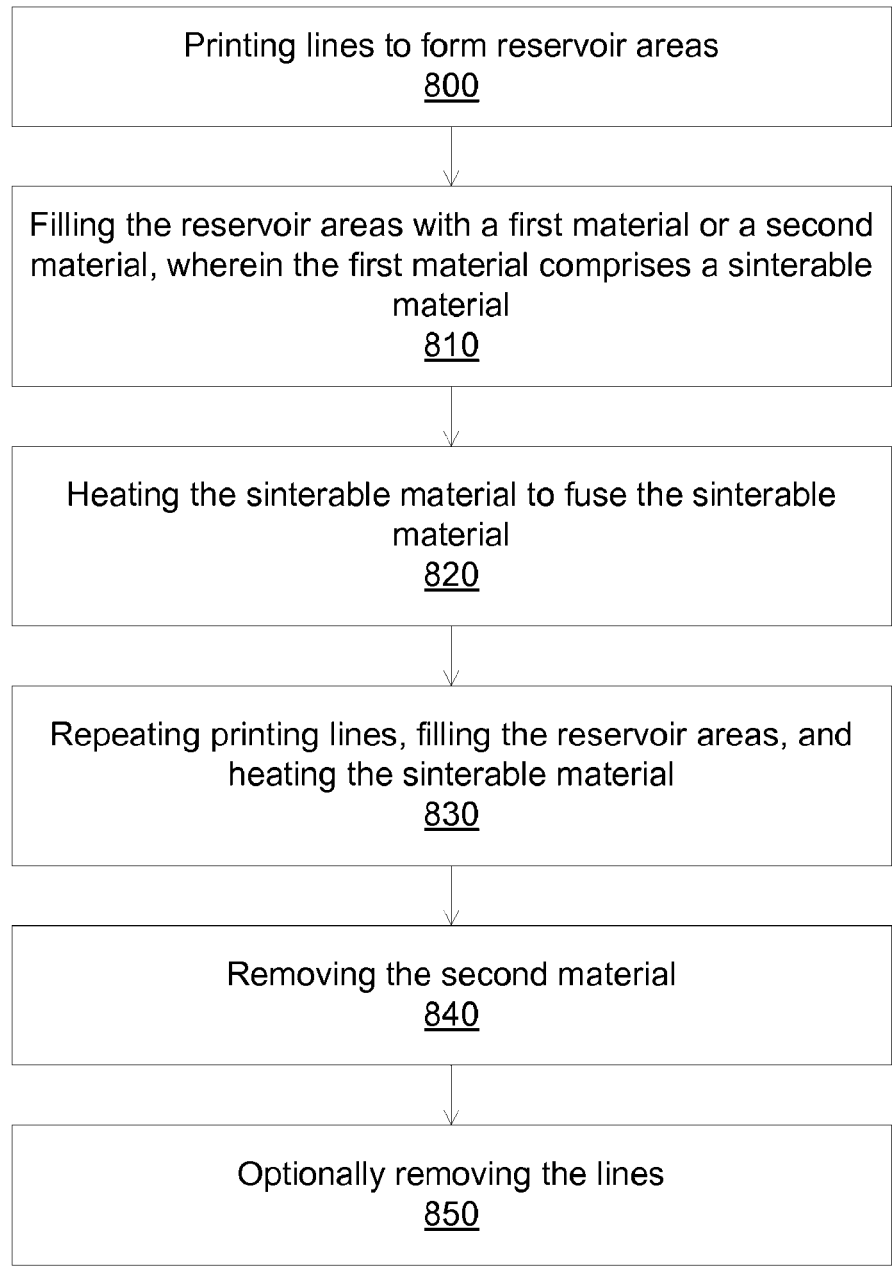
FIG. 8 illustrates a flow chart for a 3D printing process according to some embodiments.

FIG. 8 illustrates a flow chart for a 3D printing process according to some embodiments. Operation 800 prints lines to form a reservoir area. Operation 810 fills the reservoir areas with a first material or a second material, wherein the first material comprises a castable material. Operation 820 treats the castable material to fuse the castable material. Operation 830 repeats printing lines, filling the reservoir areas, and heating the castable material. Operation 840 removes the second material. Operation 850 optionally removes the lines In some embodiments, the reservoir area can include one or more close loops. The loops can include cross sectional areas of a structure to be printed, or cross sectional areas of empty areas in the structure.

In some embodiments, the second material can be a castable material or can be a non-castable material. The castable material can fill the reversoir areas that form the cross sectional areas.

In some embodiments, the heat treatment can be selectively applied to the castable material. The heat treatment can be non selectively applied to the castable material and the second material. For non selective het tretment, the second material can include a non-castable material.

In some embodiments, the boundary lines can be formed on a surface on the second material, for example, to separate the castable material from the second material.

In some embodiments, the present invention discloses systems for printing 3D objects. The systems can use a combination of 3D line printing and layer solidifying, building molds as building parts. A mold for a layer, e.g., cross sectional layer of the object, can be printed with the 3D printer, then the area formed by the mold can be cast using a 3D casting. The process is repeated layers by layers until the object is formed.

In some embodiments, the 3D printing system can include a 3D printer head for printing lines, for example, to form molds for cross sectional layers. The 3D printing system can include a 3D casting head for solidly bonding the material disposed in the area bounded by the lines that form the molds. The 3D casting head can include an assembly, such as a nozzle assembly, for depositing and distributing materials to the area inside the molds, e.g., to the area bounded by the printed lines. The 3D casting head can include an optional leveling assembly, such as a squeegee assamble, for smoothing and/or flatten the deposited material according to the bounded lines. The 3D casting head can include an assembly to bond the materials in the area inside the mold, for example, a heat treatment assembly for sintering the sinterable material, or a glue dispending assembling for gluing the glueable material.

Figure 9:
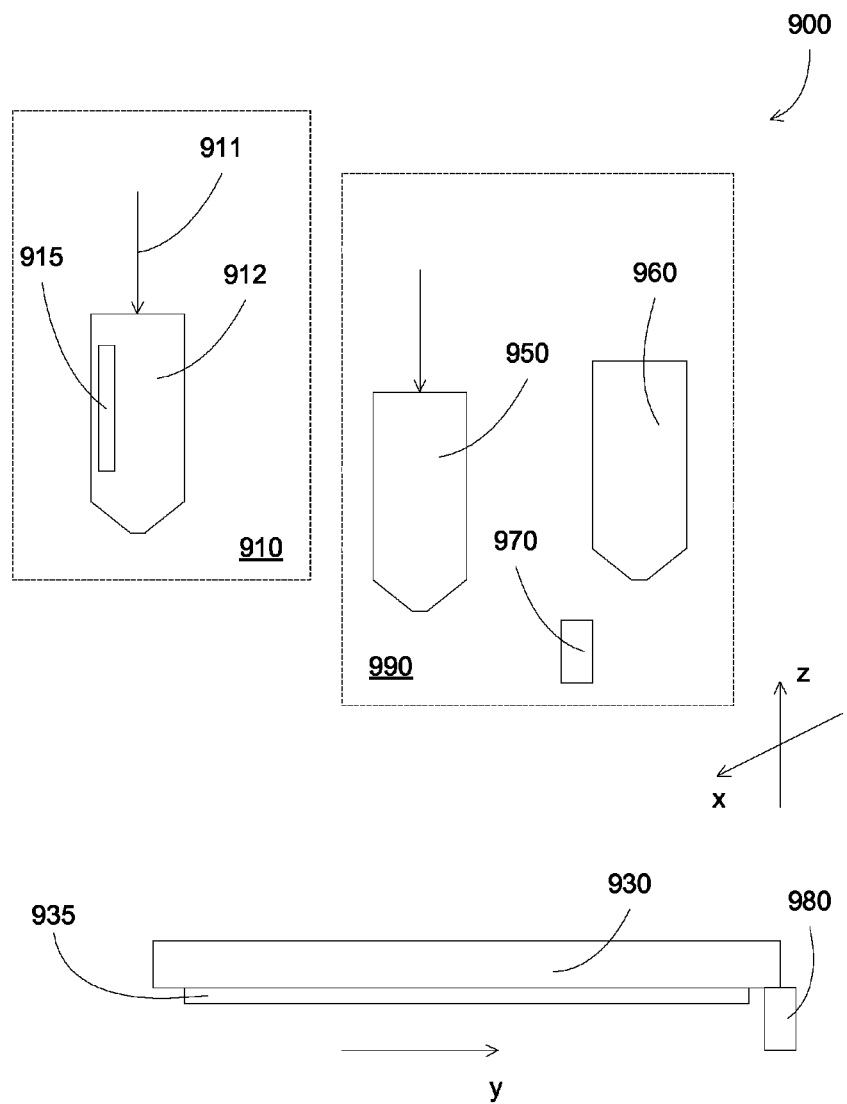
FIG. 9 illustrates a 3D printer system according to some embodiments.

FIG. 9 illustrates a 3D printer system according to some embodiments. The printer system 900 can include a 3D printer head 910 and a second head 990, together with a platform 930. The platform 930 can be heated, for example, by a heater pad 935. The 3D printer head 910, the second head 990, and the platform 930 can be moved relative to each other to allow the formation of a 3D object. For example, a movement mechanism can be coupled to the platform 930 to move the platform in one linear direction, such as a y direction. Other movement mechanisms can be coupled to the printer heads 910 and 990 to move the printer heads in other two directions, such as x and z directions. Additional movement mechanisms can be included, such as theta movement mechanism for rotating the printer heads with respect to the platform. Other configurations of movement mechanisms can be used, such as all three movement mechanisms of, y, and z can be coupled to the printer heads.

The 3D printer head 910 can include a nozzle 912 for accepting a material supply 911. The nozzle can be heated, for example, by a heater 915. The 3D printer head 910 can be operable to print lines on the platform 930.

The second printer head 990 can include a deposition assembly 950, which is operable to deposit materials in the reservoir area formed by the printer lines of the 3D printer head 910. The deposition assembly 950 can include a nozzle for delivering a powder material in the reservoir area. The nozzle can accept the powder material, for example, from an internal supply or from an external supply source.

The second printer head 990 can include an optional leveling assembly 970, which is operable to smoothen or flatten the deposited material in the reservoir area. The leveling assembly 970 can be used to form smooth and flat layers of deposited material from nozzle 950.

The second printer head 990 can include a fusing assembly 960, which is operable to fuse the deposited material together, such as a heat treatment assembly for sintering sinterable materials, or a glue dispenser assembly for gluing and bonding the deposited materials.

Optional assemblies 980 can also included, such as a vibration mechanism to assist in smoothing the deposited materials, blower or vacuuming assemblies for removing extra deposited materials from the depositing or leveling operation.

FIGS. 10A-10B illustrate a flow process for forming a 3D object according to some embodiments. FIG. 10A shows a cross sectional area AA' of a top view from FIG. 10B. A 3D printer head 1010 can be used to print boundary lines 1020 on a platform 1030. The boundary lines can correspond to the boundaries of cross sectional areas of the 3D object. The boundary lines can form one or more reservoirs or loops, which correspond to materials or voids in the cross sectional layers of the 3D object.

Figure 11:
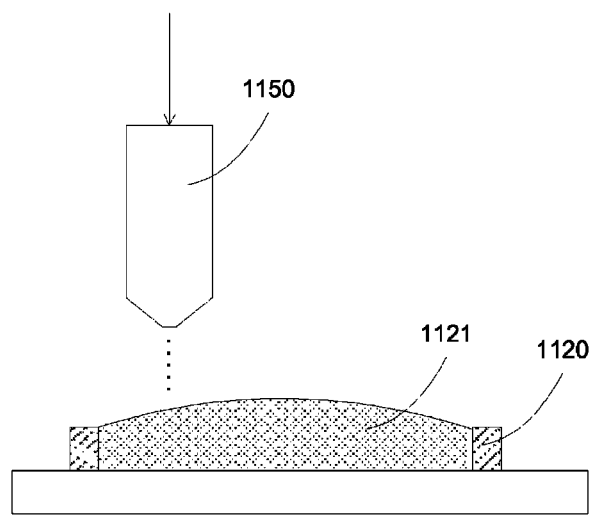
FIG. 11 illustrates a flow process for forming a 3D object according to some embodiments.

FIG. 11 illustrates a flow process for forming a 3D object according to some embodiments. FIG. 11 shows a deposition operation of a castable material 1121 in the reservoirs, for example, by a deposition head 1150. The castable material 1121 can be confined by the boundary lines 1120. The deposited material can be flat, or can be curved, depending on the deposition configurations. Vibrational energy can be provided to smoothen the castable material 1121, for example, by shaking the platform at a high frequency. A vacuum or blower assembly can be included to remove deposited materials from outside of the reservoir. The platform can include mesh, so that materials falling on the platform can be removed from the platform.

Figure 12:
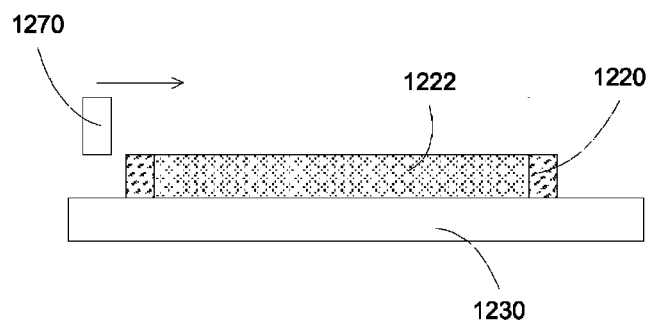
FIG. 12 illustrates a flow process for forming a 3D object according to some embodiments.

FIG. 12 illustrates a flow process for forming a 3D object according to some embodiments. FIG. 12 shows a leveling operation of the deposited material 1222 in the reservoirs, for example, by a squeegee assembly 1270. The deposited material 1222 can be confined by the boundary lines 1220. A vacuum or blower assembly can be included to remove deposited materials from outside of the reservoir. The platform 1230 can include mesh, so that materials falling on the platform can be removed from the platform.

Figure 13:
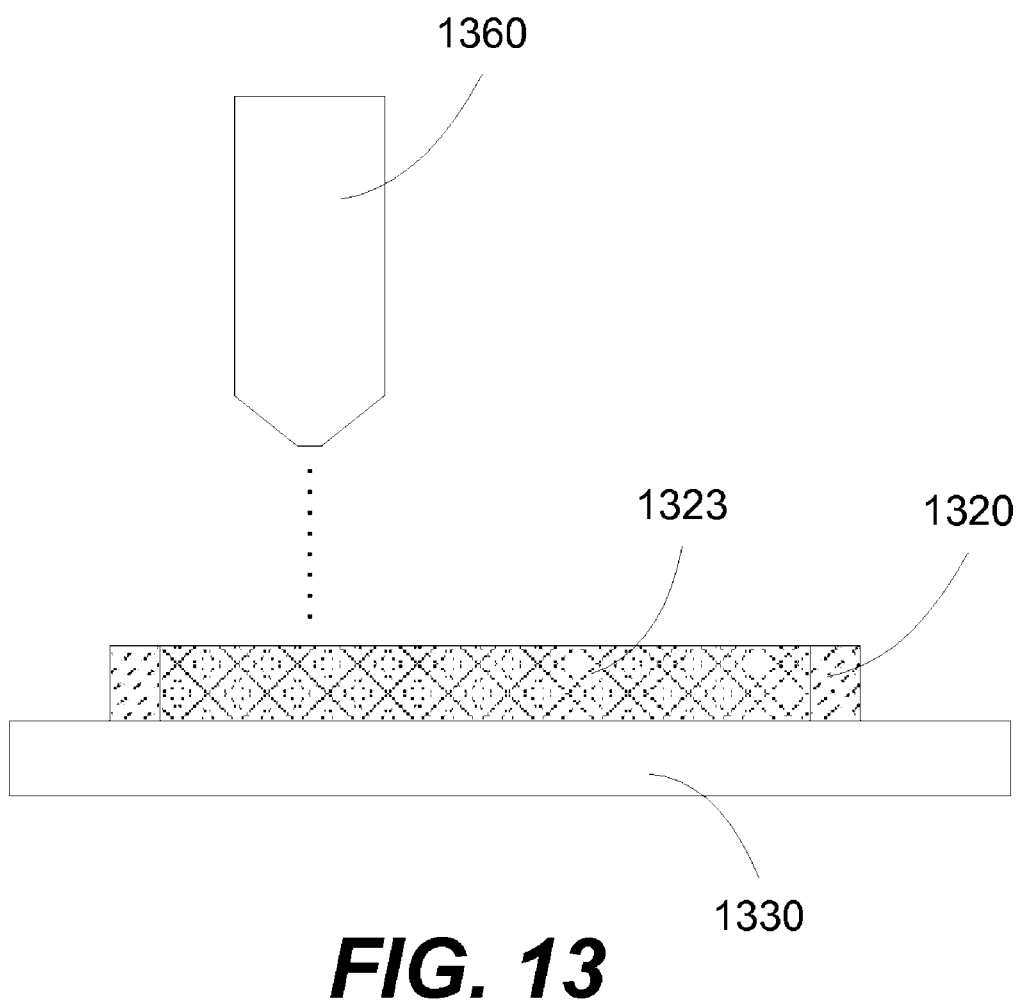
FIG. 13 illustrates a flow process for forming a 3D object according to some embodiments.

FIG. 13 illustrates a flow process for forming a 3D object according to some embodiments. FIG. 13 shows a fusing operation of the deposited material 1323 in the reservoirs, for example, by a laser assembly or a gluing dispenser assembly 1360. The castable material can be fused together to form a solidly bonded material. The process can be repeated to form a 3D object on the platform 1330. The boundary lines 1320 can be removed to obtain the cast object, formed by fusing the castable material together. An optionally annealing process can be performed on the 3D object to further solidify the 3D object. For example, the annealing process can burn the glue material, and can further incorporate additional materials to any gaps in the cast object.

FIGS. 14A-14F illustrate a 3D printing flow process according to some embodiments. An object can be designed in three dimensional construction. The object then can be dissected layers by layers, e.g., generating multiple cross sectional layers. Each cross sectional layer can include a cross sectional area, and multiple cross sectional areas or layers can be assembled next to each other to form the object. The thicknesses of the cross sectional layers can be determined by the casting process, e.g., not by the resolution of the 3D printer head, but by the fusing process of the subsequent casting process.

In FIG. 14A, a 3D printer head can be used to print a largest boundary lines 1420 of all cross sectional layers of the object on a platform 1430. For example, the all cross sections of the object can be projected on the platform, and a union of these cross sections can be used as the largest boundary line. In some embodiments, the largest boundary line can include only the union of the cross sections of a portion of the object, e.g., for a certain height of the object.

As shown, two layers of lines are used, but other number of layers can be used, such as 1 layer of lines, or more than 2 layers of lines. The boundary lines can form a reservoir area 1421. The boundary lines can include a polymer or ceramic material, which can be printed by a 3D printer head. In some embodiments, the boundary lines can be removed and discarded after forming the part.

In FIG. 14B, a castable material 1440 is deposited in the reservoir area 1421. The castable material 1440 can be in a powder form, which can be provided to the reservoir area 1421 by a rastering nozzle. The castable material can include a sinterable material, such as a sinterable polymer. The castable material can include a cross linkable material, such as a cross linkable polymer material. The castable material can include a glueable material, such as a metal or ceramic powder. An optional leveling process can be used after depositing the castable material 1440 in the reservoir area 1421, for example, to fill any area not having castable material and to remove excess castable material.

In FIG. 14C, a portion of the castable material 1440 is treated to form a solidly bonded layer 1445. The treatment process can include a heat treatment, e.g., by a laser beam or an infrared light. The treatment process can include a radiation treatment, e.g., by a UV light. The treatment process can include a bonding treatment, e.g., by dispensing a glue layer on the castable material 1440 to bond the castable material together. The treatment can be a rastering process using a small treatment beam, or can be a projected process, using a large projected screen, for example, by a projector for UV or IR light. The projector can project a desired image, e.g., light at the locations needed to be solidified, and dark at the locations not needed to be solidified.

In FIG. 14D, the process is repeated for subsequent cross sectional layers, e.g., adjacent layers, to build the object, including forming boundary lines, depositing untreated layer, and then treated the deposited layer. The boundary lines 1428 can be printed on the existing boundary line 1420. Alternatively, the boundary lines 1428 can be printed on the untreated material 1440 or on the treated material 1445. Castable material 1441 can be deposited in the boundary lines 1428.

In FIG. 14E, a portion of the castable material 1441 is treated to form a solidly bonded layer 1446. The treated layer 1446 can be larger or smaller than the treated underlayer 1445, since the boundary lines can be large enough to accommodate both layers. In FIG. 14F, the object 1448 can be removed from the platform 1430.

What is claimed is:

1. A method comprising
    forming a boundary line, wherein the boundary line forms a close curve;
    forming a layer in the inner area defined by the boundary line, wherein the boundary line and the layer comprise different materials or different material properties;
    treating the layer;
    repeating forming the boundary line, forming the layer, and treating the layer until an object is formed.

2. A method as in claim 1
    wherein the boundary line is formed by a print head of a 3D printer, wherein the print head prints from a filament.

3. A method as in claim 1
    wherein the boundary line forms a boundary of the object at the layer.

4. A method as in claim 1
    wherein the boundary line is between 3 and 10% larger than a boundary of the object at the layer to account for an anneal shrinkage of the object.

5. A method as in claim 1
    wherein the boundary line comprises one or more lines stacked on top of each other before forming the layer.

6. A method as in claim 1
    wherein the boundary line comprises one or more lines immediately adjacent to each other.

7. A method as in claim 1
    wherein the layer is formed by a print head of a 3D printer, wherein the print head prints from a filament, wherein the print head performs a raster process to generate the layer.

8. A method as in claim 1
    wherein the layer is formed by flowing a powder material to the area defined by the boundary line, followed by a planarization process.

9. A method as in claim 1
    wherein forming the layer comprises depositing a paste material in the inner area; planarizing the material.

10. A method as in claim 1
    wherein treating the layer comprises sintering or cross linking the layer.

11. A method as in claim 1
    wherein treating the layer comprises exposing the layer to a UV or IR radiation.

12. A method as in claim 1
    wherein treating the layer comprises applying a glue material to the layer.

13. A method as in claim 1 further comprising
    removing the boundary line after the object is formed.

14. A method as in claim 1 further comprising
    sintering the object after the object is formed.

15. A method comprising
    forming a boundary line, wherein the boundary line forms a close curve;
    forming a first layer in the inner area defined by the first boundary line, wherein the boundary line comprises a solid material before forming the layer, wherein the layer comprises a powder or paste material;
    treating the layer to form a solid layer;
    repeating forming the boundary line, forming the layer, and treating the layer until an object is formed.

16. A method as in claim 15 wherein the boundary line comprises one or more lines stacked on top of each other before forming the layer.

17. A method as in claim 15 further comprising removing the boundary line after the object is formed.

18. A method as in claim 15 wherein treating the layer comprises sintering or cross linking the layer;
wherein treating the layer comprises exposing the layer to a UV or IR radiation; or
wherein treating the layer comprises applying a glue material to the layer.

19. A method comprising
forming a boundary line, wherein the boundary line comprises a non cross-linkable material;
forming a first layer in the inner area defined by the first boundary line, wherein the layer comprises a cross-linkable material;
treating the layer, wherein treating the layer comprises cross linking the cross-linkable material;
repeating forming the boundary line, forming the layer, and treating the layer until an object is formed.

20. A method as in claim 19 further comprising removing the boundary line after the object is formed.

* * * * *